United States Patent
Won et al.

(10) Patent No.: US 12,213,194 B2
(45) Date of Patent: Jan. 28, 2025

(54) METHOD AND APPARATUS FOR ADMISSION CONTROL OF SESSIONS BASED ON PRIORITY

(71) Applicant: Nokia Technologies Oy, Espoo (FI)

(72) Inventors: Sung Hwan Won, Flower Mound, TX (US); Bruno Landais, Pleumeur-Bodou (FR); Devaki Chandramouli, Plano, TX (US); Alessio Casati, West Molesey (GB)

(73) Assignee: Nokia Technologies Oy, Espoo (FI)

( * ) Notice: Subject to any disclaimer, the term of this patent is extended or adjusted under 35 U.S.C. 154(b) by 431 days.

(21) Appl. No.: 17/621,354

(22) PCT Filed: Jun. 21, 2019

(86) PCT No.: PCT/US2019/038559
§ 371 (c)(1),
(2) Date: Dec. 21, 2021

(87) PCT Pub. No.: WO2020/256742
PCT Pub. Date: Dec. 24, 2020

(65) Prior Publication Data
US 2022/0369401 A1 Nov. 17, 2022

(51) Int. Cl.
*H04W 76/15* (2018.01)
*H04W 72/53* (2023.01)
(Continued)

(52) U.S. Cl.
CPC ........... *H04W 76/15* (2018.02); *H04W 72/53* (2023.01); *H04W 72/56* (2023.01); *H04W 76/18* (2018.02); *H04W 76/36* (2018.02)

(58) Field of Classification Search
None
See application file for complete search history.

(56) References Cited

U.S. PATENT DOCUMENTS

| 2018/0199240 A1 | 7/2018 | Dao et al. |
| 2018/0227743 A1 | 8/2018 | Faccin et al. |
| (Continued) | | |

FOREIGN PATENT DOCUMENTS

| CN | 108323245 A | 7/2018 |
| CN | 108400997 A | 8/2018 |
| (Continued) | | |

OTHER PUBLICATIONS

Office action received for corresponding Indian Patent Application No. 202247002668, dated Jul. 18, 2022, 6 pages.
(Continued)

*Primary Examiner* — Kouroush Mohebbi
(74) *Attorney, Agent, or Firm* — Nokia Technologies Oy

(57) ABSTRACT

A method, apparatus and computer program product are provided herein to provide a Protocol Data Unit (PDU) session priority parameter. For example, a method is provided that comprises identifying a need in a user equipment (UE) for establishing a new protocol data unit PDU session. The method also includes evaluating whether to establish a new PDU session and determining whether to establish a new PDU session based on a PDU session priority parameter when a maximum number of PDU sessions the UE can establish in the network is reached.

20 Claims, 10 Drawing Sheets

(51) Int. Cl.
  *H04W 72/56* (2023.01)
  *H04W 76/18* (2018.01)
  *H04W 76/36* (2018.01)

(56) References Cited

U.S. PATENT DOCUMENTS

2019/0059067 A1   2/2019  Lee et al.
2020/0195762 A1*  6/2020  Gan .................. H04L 69/322

FOREIGN PATENT DOCUMENTS

| WO | 2019/034291 A1 | 2/2019 |
| WO | 2019/075763 A1 | 4/2019 |
| WO | 2019/075816 A1 | 4/2019 |
| WO | 2019/098623 A1 | 5/2019 |

OTHER PUBLICATIONS

Notice of Allowance received for corresponding European Patent Application No. 19737633.8, dated Feb. 7, 2023, 8 pages.
Notice of Allowance received for corresponding European Patent Application No. 19737633.8, dated Jul. 5, 2023, 8 pages.
Office action received for corresponding Chinese Patent Application No. 201980099546.8, dated Jan. 26, 2024, 6 pages of office action and 3 pages of translation available.
Xuhua et al., "Research on Solution to 5G International Roaming Networks", China Academic Journal Electronic Publishing House, 2018, pp. 100-105.
"Update of NW-triggered Service Request for N3GPP-only PDU session", 3GPP TSG-SA2 Meeting #126, S2-181930, Huawei, Feb. 26-Mar. 2, 2018, 16 pages.
"3rd Generation Partnership Project; Technical Specification Group Core Network and Terminals; Non-Access-Stratum (NAS) protocol for 5G System (5GS); Stage 3; (Release 16)", 3GPP TS 24.501, V16.0.2, Mar. 2019, pp. 1-480.
"3rd Generation Partnership Project; Technical Specification Group Services and System Aspects; System Architecture for the 5G System; Stage 2 (Release 16)", 3GPP TS 23.501 V16.0.2, Apr. 2019, pp. 1-317.
International Search Report and Written Opinion received for corresponding Patent Cooperation Treaty Application No. PCT/US2019/038559, dated Mar. 26, 2020, 9 pages.
"5G; Non-Access-Stratum (NAS) protocol for 5G System (5GS); Stage 3 (3GPP TS 24.501 version 15.3.0 Release 15)", ETSI TS 124 501, V15.3.0, May 2019, 486 pages.

* cited by examiner

METHOD AND APPARATUS FOR ADMISSION CONTROL OF SESSIONS BASED ON PRIORITY

RELATED APPLICATION

This application was originally filed as PCT Application No. PCT/US2019/038559, filed on Jun. 21, 2019, of which is incorporated herein by reference in its entirety.

TECHNICAL FIELD

An example embodiment of the present disclosure relates to providing a Protocol Data Unit (PDU) session priority parameter and, more particularly, for providing functionality enabling the determination of whether to release an existing PDU session in order to establish a new PDU based on the PDU session priority parameter, when the maximum number of PDU sessions a User Equipment can establish is reached.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The fifth generation of mobile networks (5G networks) is expected to be the next major phase of mobile telecommunication standards and to bring many improvements in mobile network user experience. For instance, 5G networks should provide new technical solutions allowing a greater throughput, lower latency, higher reliability, higher connectivity and higher mobility range.

In addition to these improvements in terms of performance, 5G networks are also expected to extend the flexibility in the network usage and to allow providing users with a wider range of use cases and business models.

In 5G networks, if there is a need for establishing a new PDU session, a user equipment (UE) can generate a PDU session establishment request message and send, to the Access and Mobility Management Function (AMF), an uplink (UL) non-access stratum (NAS) transport message including the PDU session establishment request message, the Payload container type information element (IE) set to "N1 switching module (SM) information", and the Request type IE set to "initial request".

Upon reception of the UL NAS transport message, if the AMF determines that the Public land mobile network's (PLMN) maximum number of PDU sessions per UE has already been reached for the UE, the AMF shall send back to the UE the 5GSM message (e.g., the PDU session establishment request message) which was not forwarded and 5GMM cause #65 "maximum number of PDU sessions reached" via a downlink (DL) NAS transport message.

Thereafter, the 5GMM sublayer of the UE receiving the DL NAS transport message passes to the 5GSM sublayer an indication that the 5GSM message was not forwarded because the PLMN's maximum number of PDU sessions per UE has been reached, along with the 5GSM message included in the DL NAS TRANSPORT message. As a result, the UE handles the maximum number of established PDU sessions according to current specification (e.g., 6.4.1.5 of 3GPP TS 24.501). However, this current specification does not provide any indication with regard to the selection of a PDU session to release due to a new PDU session establishment.

In current systems, when the maximum number of PDU sessions a UE can establish is reached, the selection of a PDU session to release due to a new PDU session establishment is UE implementation specific and there is no rule for deciding whether to establish the new PDU session (e.g., even if there is a description implying that the new PDU session can be an emergency PDU session, the selection of a new PDU session which can pre-empt an existing PDU session is up to UE implementation according to the current specification). This results in heterogeneous and possibly undesired user experience, and prevents any operator control on the priority of PDU sessions to establish.

SUMMARY

In order to prevent heterogeneous and possibly undesired user experience, certain embodiments of the present invention provide interworking mechanisms to establish PDU session priority. In this regard, a first aspect of an example embodiment of the present disclosure relates to methods, apparatuses, and computer program products be configured to identify a need in a user equipment (UE) for establishing a new protocol data unit (PDU) session. The methods, apparatuses, and computer program product also include evaluating whether to establish a new PDU session, and determining whether to establish a new PDU session based on a PDU session priority parameter when a maximum number of PDU sessions the UE can establish in the network is reached.

In yet another example embodiment, methods, apparatuses, and computer program products are configured to cause transmission of a protocol data unit (PDU) session modification request message for a packet data network (PDN) connection established in an evolved packet system (EPS) upon inter-system change from the EPS, the PDU session modification request message configured to indicate a request to modify a PDU session corresponding to the PDN connection, and receive a PDU session modification command message, the PDU session modification command message comprising a PDU session priority parameter.

In another example embodiment, methods, apparatuses, and computer program products are configured to receive, from a user equipment (UE), a protocol data unit (PDU) session modification request message, the PDU session modification request message configured to indicate a request to modify a PDU session corresponding to a packet data network (PDN) connection established in an evolved packet system (EPS) upon inter-system change from the EPS, a priority of the PDU session, and cause transmission of a PDU session modification command message, the PDU session modification command message comprising a PDU session priority parameter.

In an example embodiment, methods, apparatuses, and computer program products are configured to receive, from a user equipment (UE), a protocol data unit (PDU) session establishment request message, the PDU session establishment request message configured to indicate a request to establish a new PDU session, the PDU session establishment request message comprising a PDU session priority parameter; determine a priority of the new PDU session based on the PDU session priority parameter, and cause transmission of a PDU session establishment accept or reject message, the PDU session establishment accept or reject message comprising a confirmed PDU session priority parameter.

BRIEF DESCRIPTION OF THE DRAWINGS

Certain embodiments of the present disclosure are illustrated by way of example, and not by way of limitation, in the figures of the accompanying drawings, in which like reference numerals refer to similar elements and in which.

DETAILED DESCRIPTION

Figure 1:
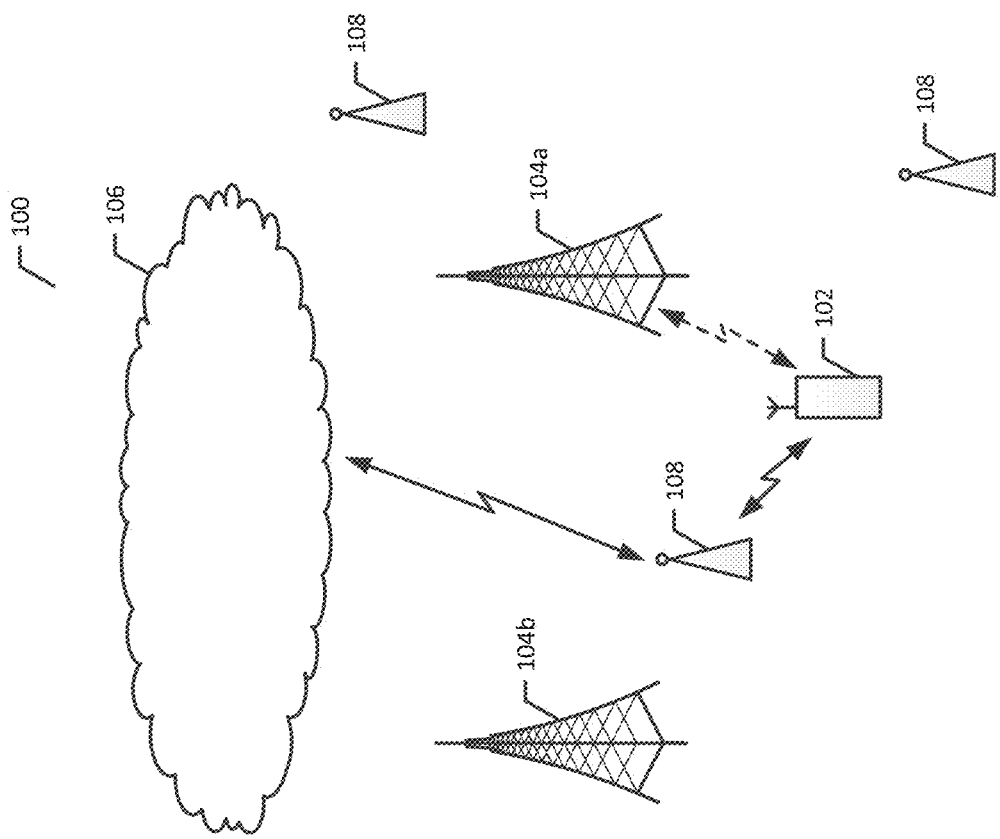
FIG. 1 depicts a system that may benefit from the procedures discussed and contemplated herein in accordance with an example embodiment of the present disclosure.

Some embodiments will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

FIG. 1 depicts an example communication system environment in which implementations in accordance with an example embodiment of the present invention may be performed. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment (UE) 102 configured to communicate wirelessly, such as via an access network, with a network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems. System environment 100, as depicted in FIG. 1, also includes one or more access points 104a and 104b, such as base stations, including but not limited to node Bs, evolved Node Bs (eNB), or the like. A cellular access point, such as a base station, may define and service one or more cells. The access points may, in turn, be in communication with a network 106, such as a core network via a gateway, such that the access points establish cellular radio access networks by which the user equipment 102 may communicate with the network. The system environment 100 of FIG. 1 may include a plurality of different cellular radio access cells and/or networks or parts of such networks including, for example, a 5G radio access network, an LTE (Long-Term Evolution) radio access network, a UMTS (universal mobile telecommunications system) radio access network, etc. In some example implementations, equipment and other infrastructure associated with multiple different cellular radio access networks may be located at or near structures and/or other equipment associated with a particular access point, such as access point 104a and 104b.

In some implementations of system environment 100, the cellular radio access networks serviced by access points 104a, 104b, and any other access points in a given area are identical, in the sense that as user equipment 102 moves from an area serviced by access point 104a to an area serviced by access point 104b. The user equipment 102 is able to access the network 106 via a radio access network provided across access points. Although not shown, the system may also include a controller associated with one or more of the cellular access points, such as, base stations, for example, so as to facilitate operation of the access points and management of the user equipment 102 in communication therewith. As shown in FIG. 1, a system may also include one or more wireless local area networks (WLANs), each of which may be serviced by a WLAN access point 108 configured to establish wireless communications with the user equipment. As such, the user equipment may communicate with the network via a WLAN access point as shown in solid lines in FIG. 1, or, alternatively, via a cellular access point as shown in dashed lines. The radio access networks as well as the core networks may consist of additional network elements as routers, switches, servers, gateways, and/or controllers.

Figure 2:
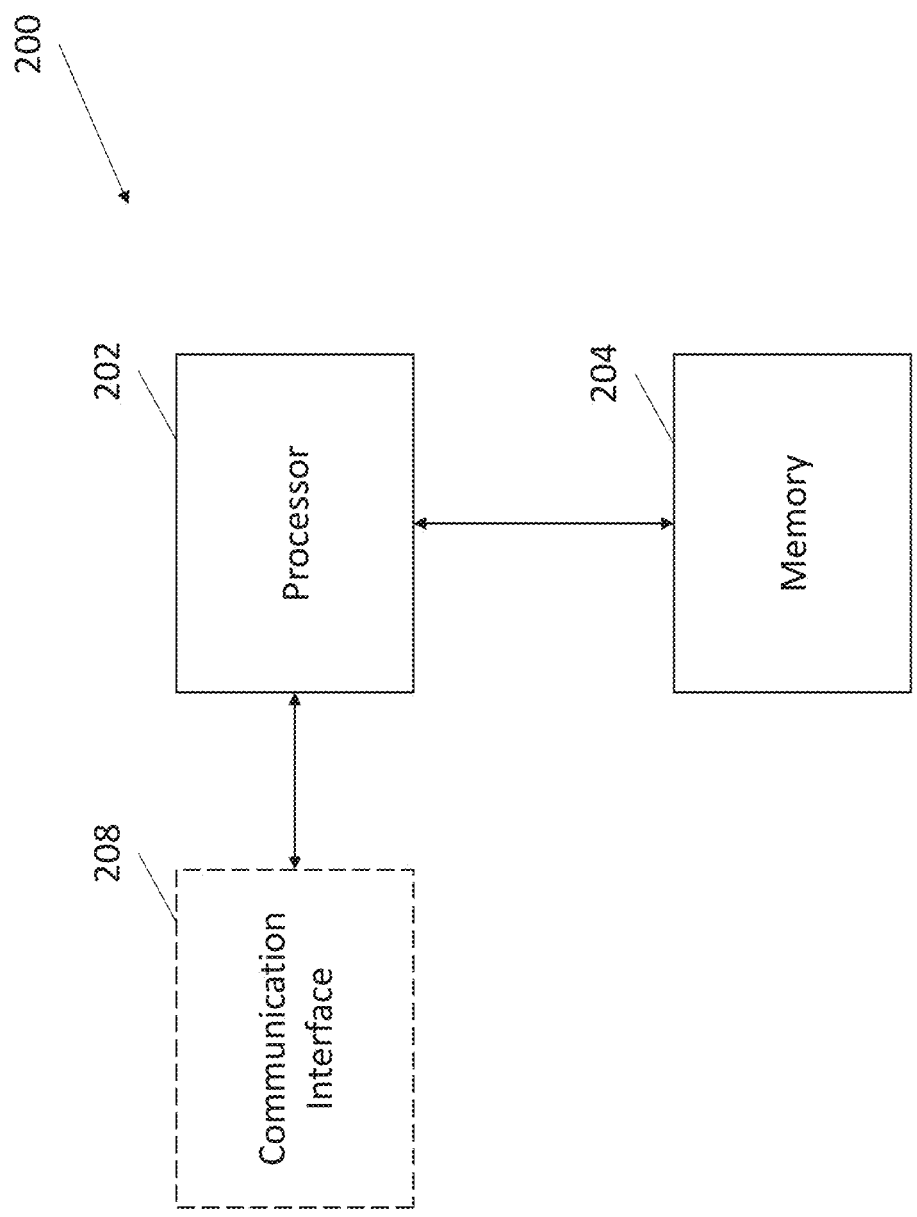
FIG. 2 is a block diagram of an apparatus configured in accordance with an example embodiment in order to control access to a hosted virtual network.

In this regard, the implementation within a network environment can be accomplished by an apparatus 200 as depicted in FIG. 2. The apparatus may be embodied by and/or incorporated into one or more UEs, such as user equipment 102, or any of the other devices discussed with respect to FIG. 1, such as access points 104a and/or 104b, one or more of WLAN access points 108, and/or devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, including but not limited to a smartphone, a tablet computer, or the like, for example.

In some embodiments, the system environment 100 may include one or more of the following network functions (NF): Authentication Server Function (AUSF), Access and Mobility Management Function (AMF), Data Network (DN), e.g. operator services, Internet access or 3rd party services, Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), UE radio Capability Management Function (UCMF), Application Function (AF), User Equipment (UE), Next Generation-Radio Access Network (NG-RAN), 5G-Equipment Identity Register (5G-EIR), Network Data Analytics Function (NWDAF), and Charging Function (CHF). The system environment may further comprise the following network entities: Service Communication Proxy (SCP) and Security Edge Protection Proxy (SEPP).

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means including processing circuitry, such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 may optionally include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Figure 3:
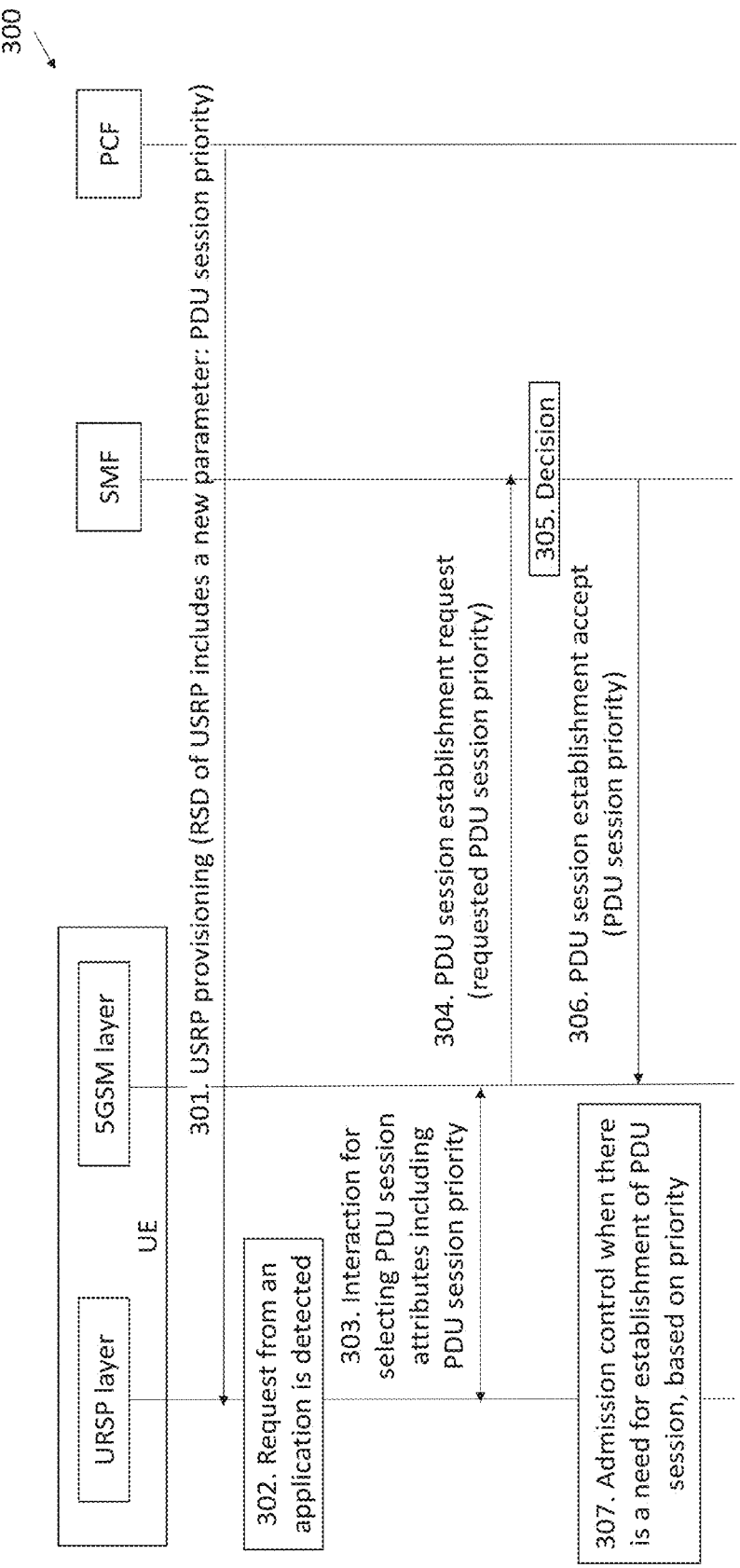
FIG. 3 shows a data flow diagram illustrating an example embodiment of the present invention.

FIG. 3 shows a data flow diagram illustrating an example embodiment of the present invention. In particular, FIG. 3 shows the initiation of a UE-initiated PDU session establishment procedure and subsequently, a session management function (SMF) response. For example, in some embodiments, a Policy Control Function (PCF) may provide the UE with user equipment (UE) route selection policy (URSP) rules at 301. The URSP rules comprising a new parameter: PDU session priority. An application in the UE requests a PDU session to be associated with the application at 302. Typical interactions are performed between the URSP handling layer and the 5GSM layer and from the URSP rules and attributes of PDU sessions available in the UE (if any), the UE decides that a new PDU session should be established at 303.

In an example embodiment, it is assumed that the maximum number of PDU sessions for the UE is not reached yet, or if it is, that the new PDU session to establish has a higher priority than some existing PDU sessions, in which case one existing PDU session is released first which will be described in further detail below.

In 304, the UE performs the UE-initiated PDU session establishment procedure by sending a PDU session establishment request message to the session management function (SMF). Additionally, the message may include the requested PDU session priority. The requested PDU session priority is determined based on the parameter "PDU session priority" in the URSP rule matching application descriptor, internal protocol (IP) descriptor, domain descriptors, non-IP descriptors, data network name (DNN), connection capabilities, and/or single-network slice selection assistance information (S-NSSAI).

Additionally or alternatively, instead of utilizing URSP, the UE can use local configuration to decide PDU session priority to be included in the PDU session establishment request message.

In 305, the SMF decides the priority of the PDU session based on at least one of the following: the requested PDU session priority, allocation and retention priority (ARP), DNN, S-NSSAI and/or local policy in the SMF. In an example embodiment, the PDU session priority can be defined as an ARP.

The SMF then sends a PDU session establishment accept message including the PDU session priority parameter at 306.

In 307, the PDU session priority values of PDU sessions are exploited to decide whether a new PDU session should be established and which PDU session should be released when a UE needs to establish a new PDU session associated with a requested PDU session priority which is higher than priority of at least one existing PDU session.

For example, if an existing PDU session needs to be released, the UE sends a PDU session release request including a 5GSM cause value (e.g. #26 "insufficient resources").

Figure 4:
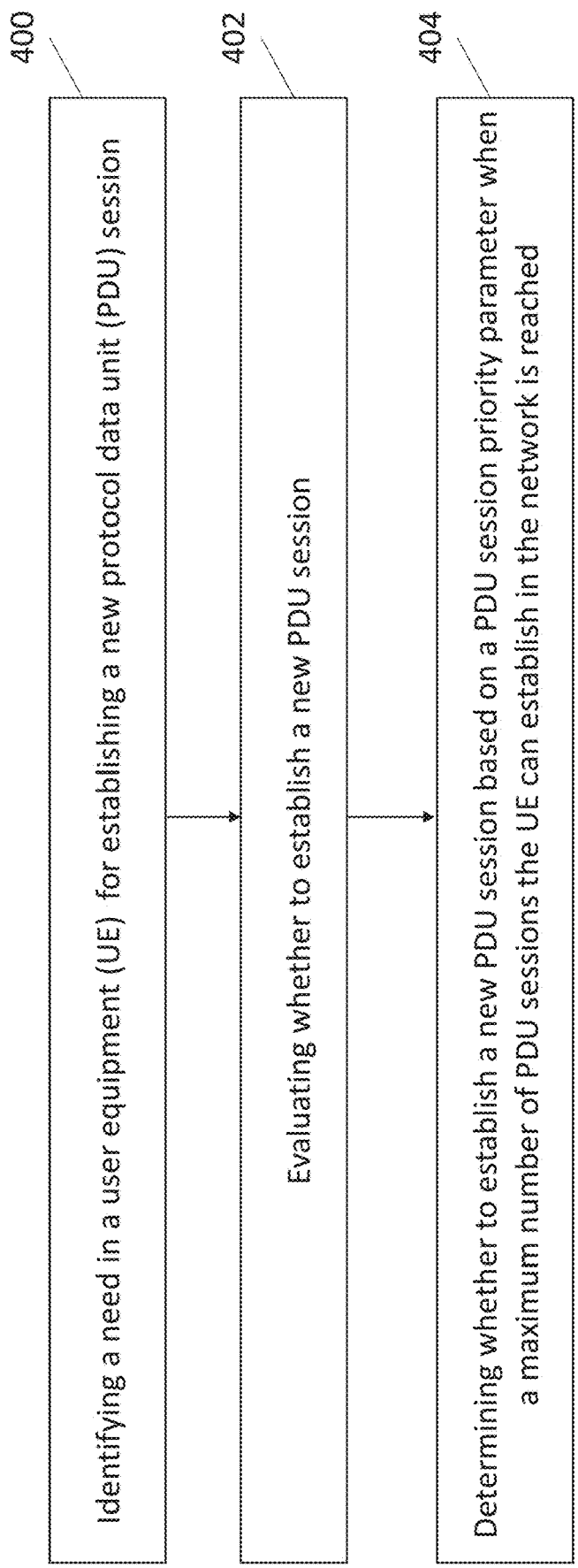
FIGS. 4 and 5 illustrates flowcharts depicting operations performed, such as by the apparatus of FIG. 2, in accordance with an example embodiment of the present disclosure.
Figure 5:
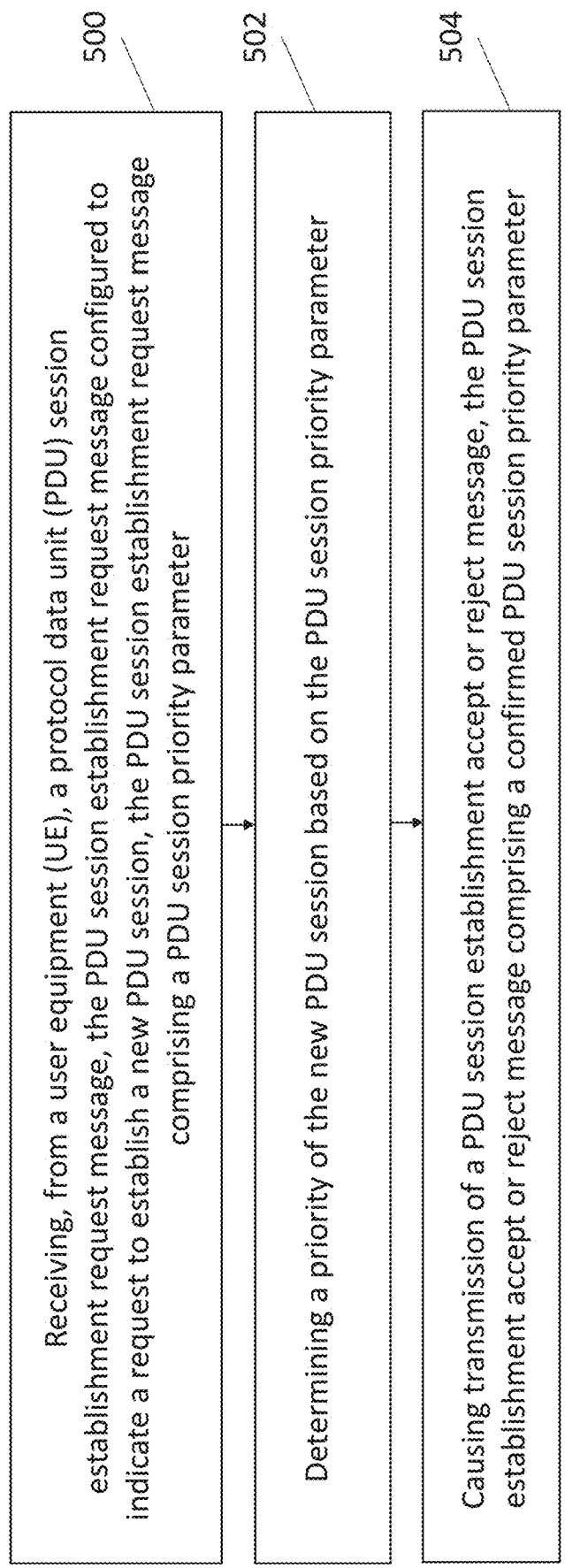

FIGS. 4 and 5 show operations performed by, for example, an apparatus embodied by UE and SMF, respectively, in order to utilize URSP comprising the PDU session priority parameter.

As shown in block 400, the apparatus includes means, such as the processor 202, the communication interface 208 or the like, for identifying a need in a user equipment (UE) for establishing a new protocol data unit (PDU) session.

Block 402 corresponds to the apparatus including means, such as the processor 202, the communication interface 208 or the like, for evaluating whether to establish a new PDU session.

In an example embodiment, the apparatus including means, such as the processor 202, the communication interface 208 or the like, for determining whether to establish a new PDU session based on a PDU session priority parameter when a maximum number of PDU sessions the UE can establish in the network is reached as shown in block 404. The PDU session priority parameter corresponds to a PDU session priority parameter in user equipment (UE) route selection policy (URSP). Additionally or alternatively, the PDU session parameter is derived from at least one of a route selection descriptor precedence or a rule precedence in URSP, DNN, single network slice selection, or S-NSSAI associated with a new PDU session.

The apparatus includes means, such as the processor 202, the communication interface 208 or the like, for upon a determination that a value of the PDU session priority parameter indicates a higher priority than at least one existing PDU session and the number of existing PDU sessions has reached a maximum number of established PDU sessions, causing transmission of a PDU session release request message, the PDU session release request message configured to indicate a request to release one of the existing PDU sessions with a lower priority value than the value of the PDU session priority parameter. The PDU session establishment request message comprises the PDU session priority parameter. The apparatus includes means, such as the processor 202, the communication interface 208 or the like, for causing transmission of a PDU session establishment request message, the PDU session establishment request message configured to indicate a request to establish a new PDU session and receiving a response message to the PDU session establishment request message and.

In another example embodiment, the response message to the PDU session establishment request message is a PDU session establishment accept message and includes confirmation of the PDU session priority parameter and the confirmed PDU session priority parameter is used as priority of the new PDU session. The confirmation of the PDU session priority parameter is based on one or more of the PDU session priority parameter, an allocation and retention priority (ARP), DNN, S-NSSAI, or a local policy in a session management function (SMF).

In an example embodiment, the PDU session priority parameter is based on determining if an application on the UE is matching one or more of an application descriptor, internal protocol (IP) descriptor, domain descriptors, non-IP descriptors, data network name (DNN), connection capabilities, or single-network slice selection assistance information (S-NSSAI).

The apparatus includes means, such as the processor 202, the communication interface 208 or the like, for upon a determination that a value of the PDU session priority parameter indicates a lower priority than all existing PDU sessions and the number of existing PDU sessions has reached a maximum number of established PDU sessions, determining that initiating a PDU session establishment request message is unsuccessful in accordance with the determination.

Upon a determination that a maximum number of established PDU sessions is unknown, causing transmission of a PDU session establishment request message, the PDU session establishment request message configured to indicate a request to establish a new PDU session, the apparatus includes means, such as the processor 202, the communication interface 208 or the like, for causing transmission of a PDU session establishment request message, the PDU session establishment request message configured to indicate a request to establish a new PDU session. The PDU session priority parameter is defined as an allocation and retention priority (ARP).

In an example embodiment, upon a determination that the PDU session priority parameter is unknown or cannot be derived from the DNN or the S-NSSAI, the apparatus includes means, such as the processor 202, the communication interface 208 or the like, for causing transmission of a PDU session establishment request message, the PDU session establishment request message configured to indicate a request to establish a new PDU session and receiving a response message to the PDU session establishment request message. As such, the response message to the PDU session establishment request message includes the PDU session priority parameter, and wherein the response message is a message indicating that the PDU session establishment request is accepted or rejected that comprises a confirmed PDU session priority parameter. Additionally or alternatively, the PDU session priority parameter is associated with the DNN and the S-NSSAI for the PDU session and the association is used to derive a PDU session priority parameter for a future determination whether to establish a new PDU session.

FIG. 5 is an example flowchart illustrating a method of operating an example apparatus, for example, apparatus 200, embodied by, for example, SMF, performed in accordance with an embodiment of the present invention.

As shown in block 500, the apparatus includes means, such as the processor 202, the communication interface 208 or the like, for receiving, from a user equipment (UE), a protocol data unit (PDU) session establishment request message, the PDU session establishment request message configured to indicate a request to establish a new PDU session, the PDU session establishment request message comprising a PDU session priority parameter.

Block 502 corresponds to the apparatus including means, such as the processor 202, the communication interface 208 or the like, for determining a priority of the new PDU session based on the PDU session priority parameter.

In an example embodiment, the apparatus including means, such as the processor 202, the communication interface 208 or the like, for causing transmission of a PDU session establishment accept or reject message, the PDU session establishment accept or reject message comprising a confirmed PDU session priority parameter as shown in block 504. The new PDU session is further based on one or more of the PDU session priority parameter, an allocation and retention priority (ARP), a data network name (DNN), single-network slice selection assistance information (S-NSSAI), or a local policy in a session management function (SMF).

In an instance in which a value of the PDU session priority parameter indicates a higher priority than an existing PDU session, the apparatus including means, such as the processor 202, the communication interface 208 or the like, for causing the UE to consider releasing the existing PDU session.

Figure 6:
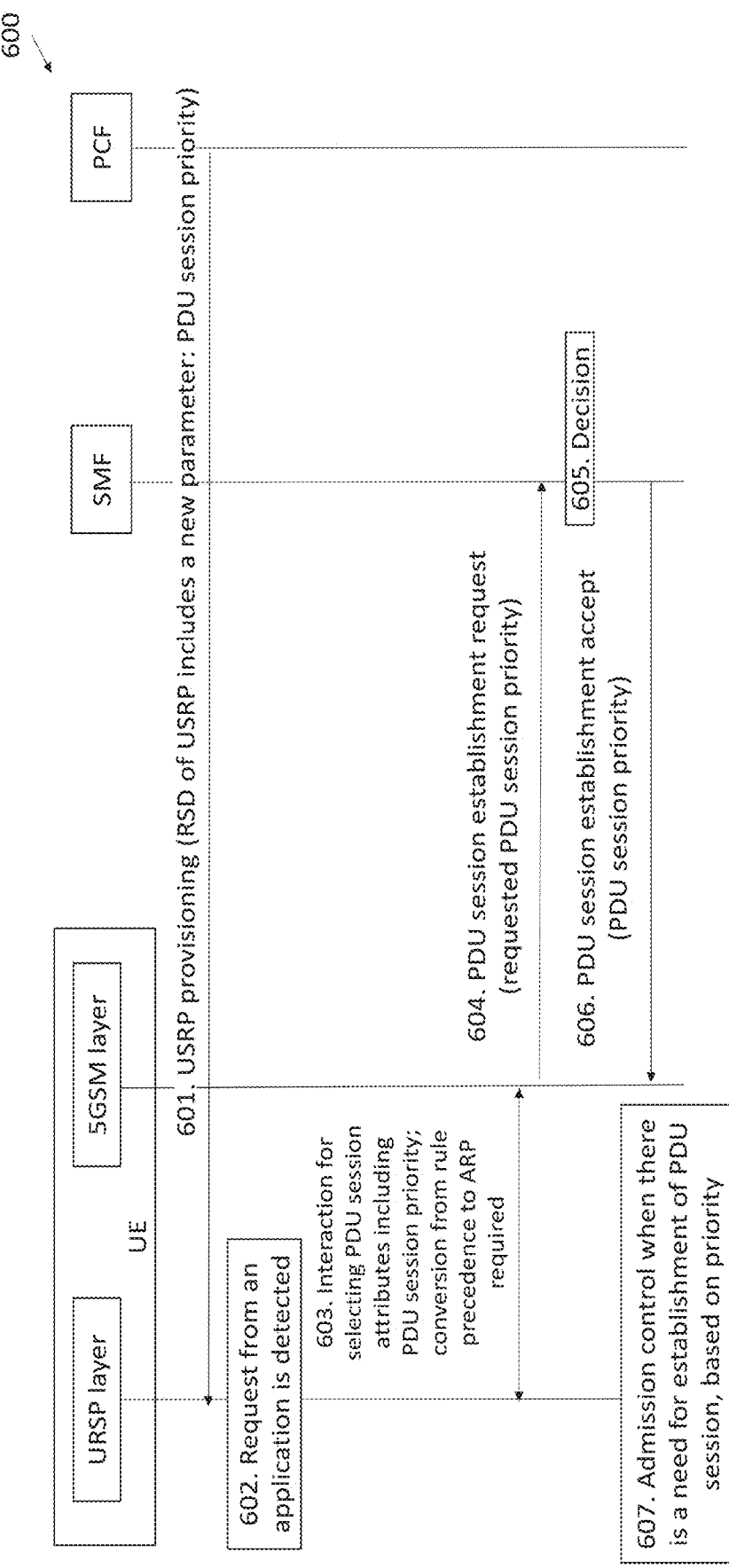
FIG. 6 shows a data flow diagram illustrating an example embodiment of the present invention.

FIG. 6 shows a data flow diagram illustrating an example embodiment of the present invention. In particular, FIG. 6 shows the initiation of a UE-initiated PDU session establishment procedure and subsequently, a session management function (SMF) response. For example, in some embodiments, a Policy Control Function (PCF) may provide the UE with user equipment (UE) route selection policy (URSP) rules at 601. The URSP rules comprising an existing parameter "rule precedence" or "route selection descriptor precedence" in the URSP which is used to derive the priority of the PDU session as discussed in herein.

An application in the UE requests a PDU session to be associated with the application at 602. Typical interactions are performed between the URSP handling layer and the 5GSM layer and from the URSP rules and attributes of PDU sessions available in the UE (if any), the UE decides that a new PDU session should be established at 603.

In an example embodiment, it is assumed that the maximum number of PDU sessions for the UE is not reached yet, or if it is, that the new PDU session to establish has a higher priority than some existing PDU sessions, in which case one existing PDU session is released first which will be described in further detail below.

In 604, the UE performs the UE-initiated PDU session establishment procedure by sending a PDU session establishment request message to the session management function (SMF). Additionally, the message may include the requested PDU session priority. The requested PDU session priority is derived from an existing parameter "rule precedence" or "route selection descriptor precedence" in the URSP.

In 605, the SMF decides the priority of the PDU session based on the requested PDU session priority, allocation and retention priority (ARP), DNN, S-NSSAI and/or local policy in the SMF. In an example embodiment, the PDU session priority can be defined as an ARP.

The SMF then sends a PDU session establishment accept message including the PDU session priority parameter at 606.

In 607, the PDU session priority values of PDU sessions are exploited to decide whether a new PDU session should be established and which PDU session should be released when a UE needs to establish a new PDU session associated with a requested PDU session priority which is higher than priority of at least one existing PDU session.

For example, if an existing PDU session needs to be released, the UE sends a PDU session release request including a 5GSM cause value (e.g. #26 "insufficient resources").

In an example embodiment, an apparatus embodied by UE, utilizes a PDU session priority parameter derived from an existing parameter "rule precedence" or "route selection descriptor precedence" in the URSP.

The apparatus includes means, such as the processor 202, the communication interface 208 or the like, for evaluating user equipment (UE) route selection policy (URSP) for an application on the UE to determine whether or not there is an existing protocol data unit (PDU) session that can be associated with the application.

The apparatus including means, such as the processor 202, the communication interface 208 or the like, for upon a determination that no existing PDU session can be associated with the application, causing transmission of a PDU session establishment request message, the PDU session establishment request message configured to indicate a request to establish a new PDU session, the PDU session establishment request message comprising a PDU session priority parameter, wherein the PDU session priority parameter is derived from a route selection descriptor precedence.

The apparatus includes means, such as the processor 202, the communication interface 208 or the like, for receiving confirmation of the PDU session priority parameter via a PDU session establishment accept message. In another example embodiment, the apparatus includes means, such as the processor 202, the communication interface 208 or the like, for determining an admission control response to establishing the new PDU session based on the PDU session priority parameter.

The apparatus including means, such as the processor 202, the communication interface 208 or the like, for upon a determination that a value of the PDU session priority parameter indicates a higher priority than the existing PDU session, causing transmission of a PDU session release request message, the PDU session release request message configured to indicate a request to release the existing PDU session.

In an example embodiment, the apparatus including means, such as the processor 202, the communication interface 208 or the like, for receiving an indication that the PDU session establishment request message configured to indicate the request to establish the new PDU session was not transmitted, resulting in the user equipment reaching a maximum number of established PDU sessions and in response to the indication, the apparatus including means, such as the processor 202, the communication interface 208 or the like, for causing transmission of the PDU session release request message, the PDU session release request message configured to indicate a request to release the existing PDU session, wherein the value of the PDU session priority parameter of the new PDU session indicates a higher priority than the existing PDU session.

In an example embodiment, the PDU session priority parameter is defined as an allocation and retention priority (ARP).

In yet another example embodiment, an apparatus embodied by UE, utilizes a PDU session priority value in the PDU session establishment accept message.

The apparatus includes means, such as the processor 202, the communication interface 208 or the like, for causing transmission of a protocol data unit (PDU) session establishment request message, the PDU session establishment request message configured to indicate a request to establish a new PDU session.

The apparatus includes means, such as the processor 202, the communication interface 208 or the like, for receiving a PDU session establishment accept message, the PDU session establishment accept message comprising a PDU session priority value.

In an example embodiment, the apparatus includes means, such as the processor 202, the communication interface 208 or the like, for storing the PDU session priority value for data network name (DNN) or single-network slice selection assistance information (S-NSSAI) associated with the new PDU session.

The apparatus includes means, such as the processor 202, the communication interface 208 or the like, for determining an admission control response to establishing the new PDU session based on the PDU session priority value.

Figure 7:
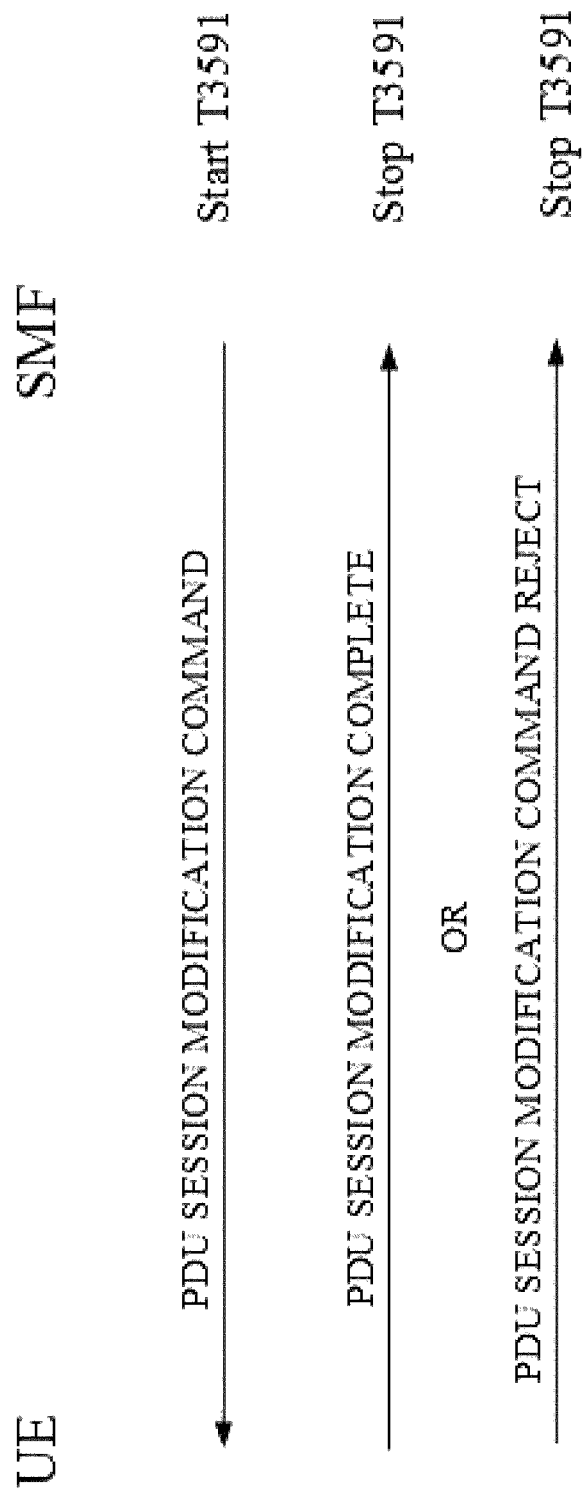
FIG. 7 shows a signal flow diagram illustrating an example embodiment of the present invention.

FIG. 7 shows a signal flow diagram illustrating an example embodiment of the present invention. In particular, FIG. 7 shows signalling communications between the UE and SMF for a packet data network (PDN) connection established when in S1 mode. For example for a PDN connection established when in S1 mode, upon the first inter-system change from S1 mode to N1 mode, if the network-requested PDU session modification procedure is triggered by a UE-requested PDU session modification procedure (e.g., the PDU session modification command message is sent by the SMF as a response to the PDU session modification request message from the UE), the SMF can include the PDU session priority parameter in the PDU session modification command message. The PDU session priority may be derived from one or more of the PDU session priority (if included in the PDU session modification request message; the UE can decide the PDU session priority based on one or more of DNN and S-NSSAI associated with the PDN connection), DNN, S-NSSAI, a local policy in a session management function (SMF), and/or ARP(s) evolved packet system (EPS) bearer(s) of the PDN connection.

Figure 8:
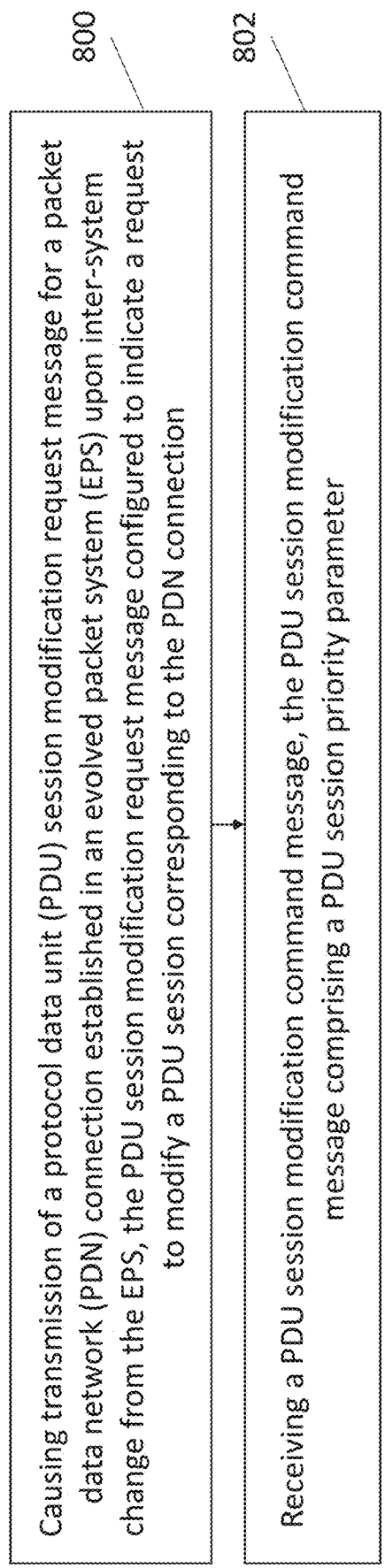
FIGS. 8 and 9 illustrate flowcharts depicting operations performed, such as by the apparatus of FIG. 2, in accordance with an example embodiment of the present disclosure.
Figure 9:
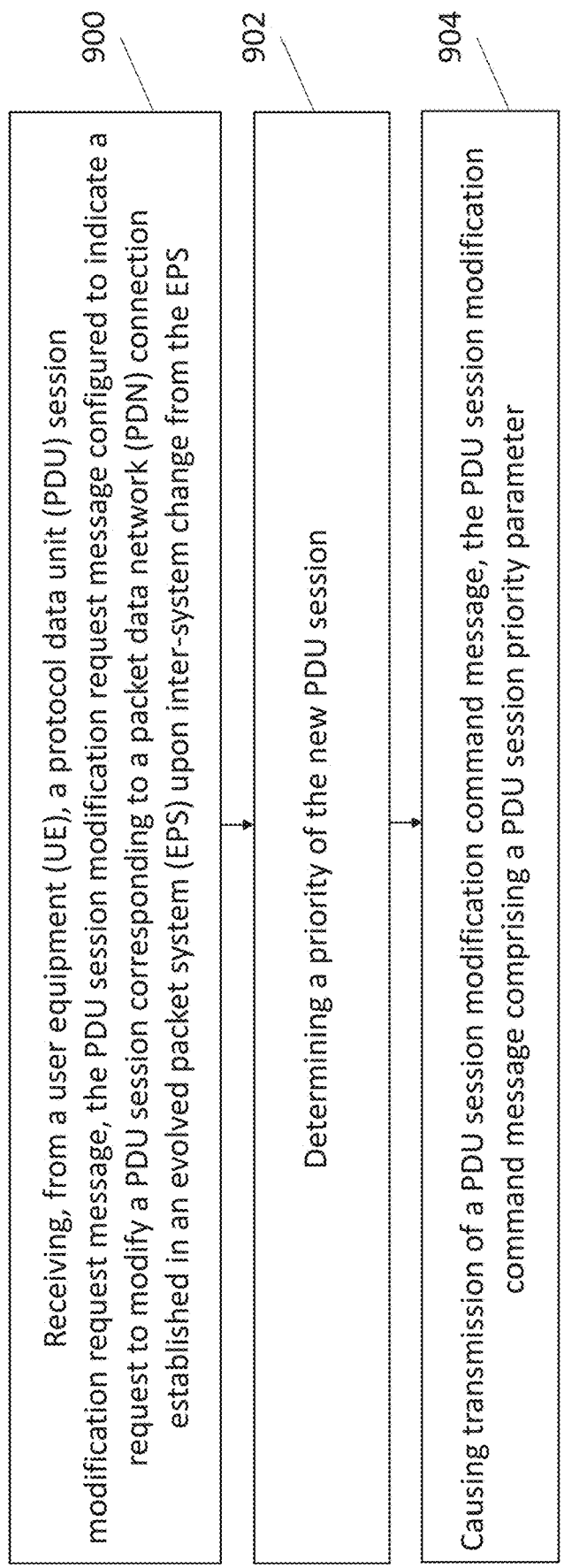

FIGS. 8 and 9 show operations performed by, for example, an apparatus embodied by UE and SMF, respectively, in a PDN connection. As shown in block 800, the apparatus includes means, such as the processor 202, the communication interface 208 or the like, for causing transmission of a protocol data unit (PDU) session modification request message for a packet data network (PDN) connection established in an evolved packet system (EPS) upon inter-system change from the EPS, the PDU session modification request message configured to indicate a request to modify a PDU session corresponding to the PDN connection.

In block 802, the apparatus includes means, such as the processor 202, the communication interface 208 or the like, for receiving a PDU session modification command message, the PDU session modification command message comprising a PDU session priority parameter.

The PDU session priority parameter is derived from a PDU session priority parameter included in the PDU session modification request message; data network name (DNN); single-network slice selection assistance information (S-NSSAI); allocation and retention priority (ARP) of one or more EPS bearers belonging to the PDN connection; or a local policy in a session management function (SMF).

In an example embodiment, the PDU session priority parameter included in the PDU session modification request message is derived from the DNN and the S-NSSAI.

Upon inter-system change from the EPS, the apparatus includes means, such as the processor 202, the communication interface 208 or the like, for determining a PDU session priority parameter of a PDU session corresponding to a PDN connection established in EPS based on one or more of DNN and S-NSSAI associated with the PDN connection.

FIG. 9 is an example flowchart illustrating a method of operating an example apparatus, for example, apparatus 200, embodied by, for example, SMF, performed in accordance with an embodiment of the present invention.

As shown in block 900, the apparatus includes means, such as the processor 202, the communication interface 208 or the like, for Receiving, from a user equipment (UE), a protocol data unit (PDU) session modification request message, the PDU session modification request message configured to indicate a request to modify a PDU session corresponding to a packet data network (PDN) connection established in an evolved packet system (EPS) upon inter-system change from the EPS.

In Block 902, the apparatus includes means, such as the processor 202, the communication interface 208 or the like, for determining a priority of the new PDU session.

In an example embodiment, the apparatus includes means, such as the processor 202, the communication interface 208 or the like, for causing transmission of a PDU session modification command message, the PDU session modification command message comprising a PDU session priority parameter as shown in block 904.

In an example embodiment, the PDU session priority parameter is derived from one or more of the following: a PDU session priority parameter included in the PDU session modification request message; data network name (DNN); single-network slice selection assistance information (S-NSSAI); allocation and retention priority (ARP) of one or more EPS bearers belonging to the PDN connection; or a local policy in a session management function (SMF). The PDU session priority parameter included in the PDU session modification request message is derived from the DNN and the S-NSSAI.

Figure 10:
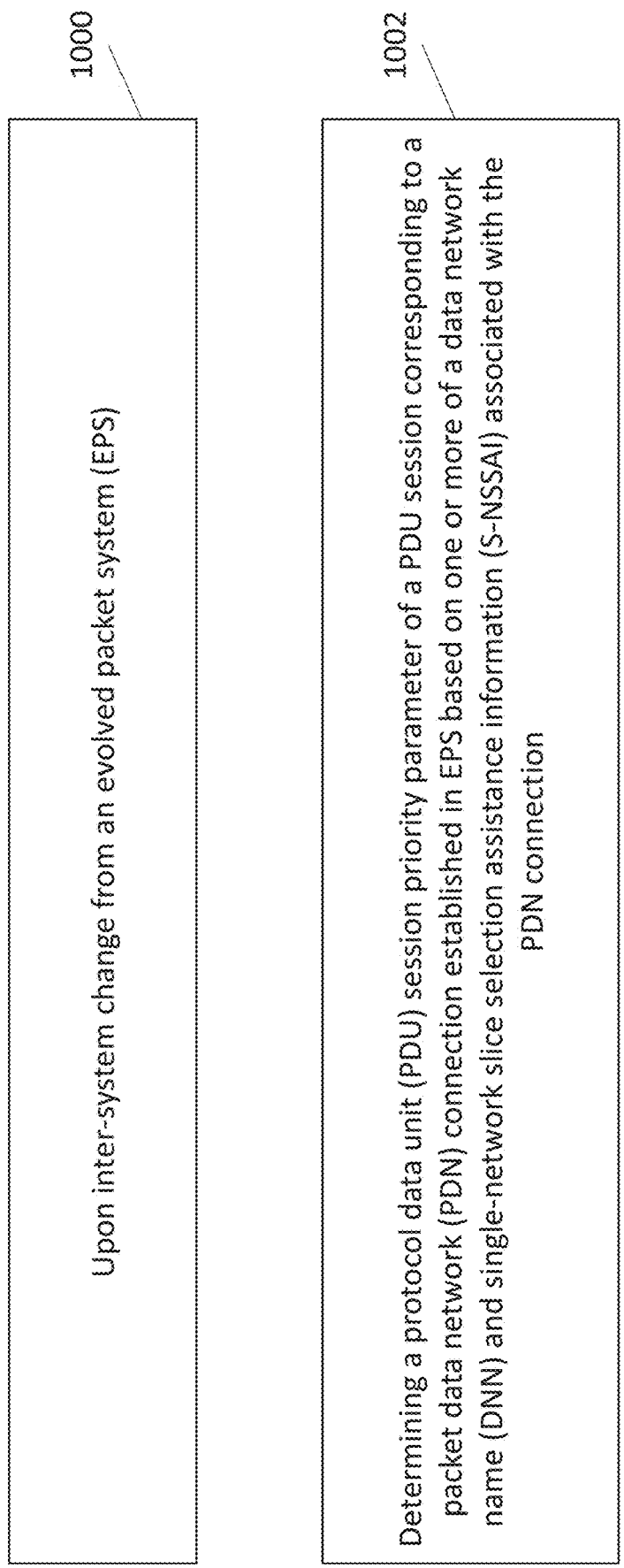
FIG. 10 is a flowchart illustrating operation of an apparatus embodied by, for example, a UE or a session management function (SMF) in accordance with an example embodiment of the present invention.

FIG. 10 is an example flowchart illustrating a method of operating an example apparatus, for example, apparatus 200, embodied by, for example, UE and SMF, performed in accordance with an embodiment of the present invention.

As shown in block 1000, upon inter-system change from an evolved packet system (EPS), the apparatus includes means, such as the processor 202, the communication interface 208 or the like, for determining a protocol data unit (PDU) session priority parameter of a PDU session corresponding to a packet data network (PDN) connection established in EPS based on one or more of a data network name (DNN) and single-network slice selection assistance information (S-NSSAI) associated with the PDN connection as shown in block 1002.

As described above, FIGS. 3-10 include signalling diagrams, data communication diagrams, and flowcharts of an apparatus 200, method, and computer program product according to certain example embodiments. It will be understood that each block of the flowcharts, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 4, 5, 8, 9 and 10. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks outlined in dashed lines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contem-

The invention claimed is:

1. A method comprising:
identifying, by a user equipment (UE), a need to establish a new protocol data unit (PDU) session for the UE;
evaluating, by the UE, whether a maximum number of PDU sessions that can be established for the UE in the network is reached; and
determining, by the UE, whether to establish the new PDU session based on a PDU session priority parameter associated with the new PDU session when the maximum number of PDU sessions that can be established for the UE in the network is reached.

2. The method according to claim 1, wherein the PDU session priority parameter corresponds to a PDU session priority parameter in a user equipment (UE) route selection policy (URSP).

3. The method according to claim 1, wherein the PDU session priority parameter is derived from at least one of:
a route selection descriptor precedence or a rule precedence in user equipment (UE) route selection policy (URSP) associated with the new PDU session;
a data network name (DNN) associated with the new PDU session;
a single network slice selection assistance information (S-NSSAI) associated with the new PDU session.

4. The method according to claim 1, wherein the determining whether to establish the new PDU session based on the PDU session priority parameter comprises:
upon a determination that a value of the PDU session priority parameter indicates that the new PDU session has a higher priority than that of at least one existing PDU session of the UE and number of existing PDU sessions has reached the maximum number of PDU sessions that can be established for the UE, transmitting a PDU session release request message, the PDU session release request message configured to request to release one of the existing PDU sessions, the one of the existing PDU sessions having a lower priority than that of the PDU session priority parameter;
transmitting a PDU session establishment request message, the PDU session establishment request message configured to request the network to establish the new PDU session; and
receiving a response message to the PDU session establishment request message.

5. The method according to claim 4, wherein the PDU session establishment request message comprises the PDU session priority parameter.

6. The method according to claim 4, wherein the response message to the PDU session establishment request message is a PDU session establishment accept message that includes confirmation of a value for the PDU session priority parameter, and wherein the confirmation of the value of the PDU session priority parameter included in the response message is used to indicate priority for the new PDU session.

7. The method according to claim 6, wherein the confirmation of the value of the PDU session priority parameter is based on one or more of the value of the PDU session priority parameter, an allocation and retention priority (ARP), data network name (DNN), single network slice selection assistance information (S-NSSAI), or a local policy in a session management function (SMF).

8. The method according to claim 1, wherein the value of the PDU session priority parameter is based on determining if an application on the UE and associated with the new PDU session is matching one or more of an application descriptor, internal protocol (IP) descriptor, domain descriptors, non-IP descriptors, data network name (DNN), connection capabilities, or single-network slice selection assistance information (S-NSSAI).

9. The method according to claim 1, wherein the determining whether to establish the new PDU session based on the PDU session priority parameter comprises:
upon a determination that a value of the PDU session priority parameter indicates a lower priority than that of all existing PDU sessions of the UE and number of existing PDU sessions has reached the maximum number of PDU sessions that can be established for the UE, determining that initiating a PDU session establishment request message is unsuccessful in accordance with the determination.

10. The method according to claim 1, wherein the determining whether to establish the new PDU session based on the PDU session priority parameter comprises:
upon a determination that the maximum number of established PDU sessions is unknown, transmitting a PDU session establishment request message, the PDU session establishment request message configured to a request to establish the new PDU session.

11. The method according to claim 1, wherein the PDU session priority parameter is defined as an allocation and retention priority (ARP).

12. The method according to claim 1 wherein the determining whether to establish the new PDU session based on the PDU session priority parameter comprises:
upon a determination that the PDU session priority parameter is unknown or cannot be derived from a data network name (DNN) associated with the new PDU session or single network slice selection assistance information (S-NSSAI) associated with the new PDU session, transmitting a PDU session establishment request message, the PDU session establishment request message configured to request to establish a new PDU session; and
receiving a response message to the PDU session establishment request message.

13. The method according to claim 12, wherein the response message to the PDU session establishment request message includes indicates that the PDU session establishment request is accepted or rejected and comprises a confirmed value of the PDU session priority parameter.

14. The method according to claim 1, wherein the PDU session priority parameter is associated with a data network name (DNN) and single network slice selection information (S-NSSAI) for the new PDU session and association of the PDU session priority parameter, the DNN, and the S-NSSAI for the new PDU session is used to derive another PDU session priority parameter for a future determination whether to establish another new PDU session.

15. A user equipment (UE) comprising:
at least one processor; and
at least one memory including computer program code which, when executed by the at least one processor, causes the apparatus to at least:
identify a need in the UE to establish a new protocol data unit (PDU) session for the UE;
evaluate whether a maximum number of PDU sessions that can be established for the UE in the network is reached; and determine whether to establish the new PDU session based on a PDU session priority parameter associated with the new PDU session when the maximum number of PDU sessions that can be established for the UE the network is reached.

16. A method comprising:
receiving, by a session management function (SMF), from a user equipment (UE), a protocol data unit (PDU) session establishment request message, the PDU session establishment request message configured to indicate a request to establish a new PDU session, the PDU session establishment request message comprising a PDU session priority parameter;
determining, by the SMF, a priority of the new PDU session based on the PDU session priority parameter; and
causing, by the SMF, transmission of a PDU session establishment accept or reject message to the UE, the PDU session establishment accept or reject message comprising the priority of the new PDU session that is determined by the SMF.

17. A method of claim 16, wherein the determining the priority of the new PDU session is further based on one or more of the PDU session priority parameter, an allocation and retention priority (ARP), a data network name (DNN), single-network slice selection assistance information (S-NSSAI), or a local policy in a session management function (SMF).

18. A method of according to claim 16, wherein in an instance in which a value of the priority of the new PDU session that is determined by the SMF indicates a higher priority than that of an existing PDU session, the transmission of a PDU session establishment accept or reject message is configured to cause the UE to consider releasing the existing PDU session.

19. An apparatus comprising:
at least one processor; and
at least one memory including computer program code which, when executed by the at least one processor, cause the apparatus to at least:
receive, from a user equipment (UE), a protocol data unit (PDU) session establishment request message, the PDU session establishment request message configured to indicate a request to establish a new PDU session, the PDU session establishment request message comprising a PDU session priority parameter;
determine a priority of the new PDU session based on the PDU session priority parameter; and
cause transmission of a PDU session establishment accept or reject message to the UE, the PDU session establishment accept or reject message comprising the priority of the new PDU session that is determined by the apparatus.

20. A computer program product comprising:
computer readable non-transitory memory medium having program code instructions stored thereon, the program code instructions configured to, when executed by a user equipment, cause the user equipment at least to perform:
receiving, from a user equipment (UE), a protocol data unit (PDU) session establishment request message, the PDU session establishment request message configured to indicate a request to establish a new PDU session, the PDU session establishment request message comprising a PDU session priority parameter;
determining a priority of the new PDU session based on the PDU session priority parameter; and
causing transmission of a PDU session establishment accept or reject message to the UE, the PDU session establishment accept or reject message comprising the priority of the new PDU session that is determined by the SMF.

* * * * *